Nov. 19, 1935.   L. B. SKINNER   2,021,671
MANUFACTURE OF SUPERPHOSPHATES
Filed Jan. 19, 1931
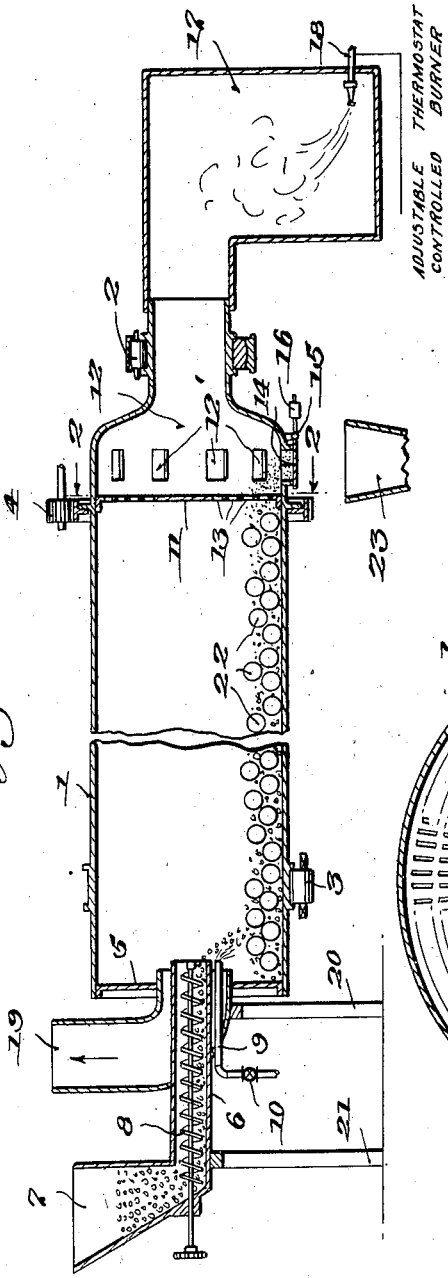
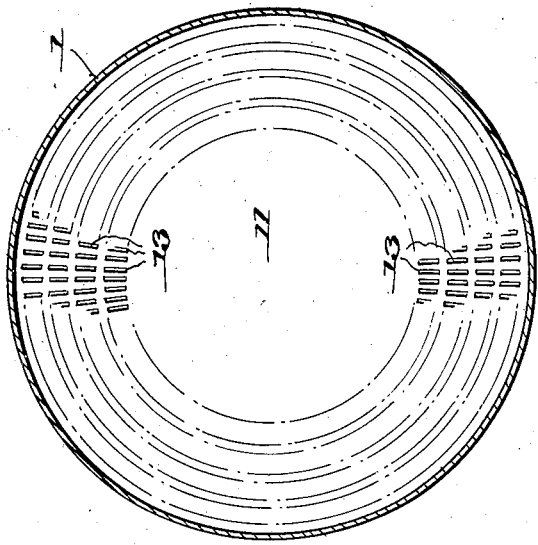
Inventor
LEWIS B. SKINNER,
By
Attorneys Patented Nov. 19, 1935

2,021,671

UNITED STATES PATENT OFFICE 2,021,671

MANUFACTURE OF SUPERPHOSPHATES

Lewis Bailey Skinner, Denver, Colo.

Application January 19, 1931, Serial No. 509,817

27 Claims. (Cl. 23—109)

This invention relates to the manufacture of alkaline earth acid or hydrogen phosphates, especially mono-calcium ortho-phosphate.

The largest market for acid or hydrogen phosphates is for fertilizers; and for such use the value of the material depends on its soluble $P_2O_5$ content as that solubility determines the amount of plant food constituents which are available for use by the plant. For example, in states having laws for the protection of the farmer's purchases of fertilizers, official methods for chemical determination of the available plant food constituents are prescribed, and in the case of a phosphate fertilizer, analyses must show what part of the $P_2O_5$ content is soluble in water and what part is soluble in the now universally accepted citrate solution standardized by the U. S. Department of Agriculture and the Association of Official Agricultural Chemists. Both the water and the citrate soluble $P_2O_5$ are considered as available parts of the fertilizer upon which payment is to be based, while all $P_2O_5$ not water or citrate soluble is considered as unavailable and not to be paid for. Because of the foregoing facts and also because freight and handling costs depend on the total weight of the material, it is highly desirable to produce material having high soluble $P_2O_5$ content; and one of the general objects of the present invention is to produce such material.

In further considering, as a preliminary to a presentation of the principles of the present invention, the materials for a phosphate fertilizer, and especially the calcium phosphates, it is to be noted that tricalcium orthophosphate ($3CaO.P_2O_5$), whether initially in the rock employed as the starting material or formed in the process of producing the fertilizer, is insoluble in water and citrate solution and not of much use when applied to soils except after some five or six years action thereon by humic acid and other natural elements. The application, therefore, of tri-calcium orthophosphate to soils is considered by up-to-date agronomists as practically useless so far as a financial return to the farmer within a reasonably expected time is concerned. Dicalcium ortho-phosphate ($CaHPO_4$), while only slightly "water-soluble", is "citrate-soluble", and is considered available. The mono-calcium ortho-phosphate, $CaH_4(PO_4)_2$, is quite readily soluble in water; and, as it also has a greater percentage of $P_2O_5$ than the di-calcium salt, 60.7% as compared with 52.2%, it is of greater value for fertilizer purposes.

Although its phosphate content is chiefly in the form of the more valuable mono-calcium ortho-phosphate, the ordinary superphosphate of commerce only contains about 16% of $P_2O_5$, due to the mono-calcium phosphate being associated with large amounts of non-phosphate material. In the first place, the phosphate rock usually employed, even after screening and washing, rarely runs over 75% tricalcium phosphate to begin with as a basis for the production of the desired mono-calcium ortho-phosphate. The remaining 25% consists of silicates, sand and other non-phosphatic matters, substantially valueless as fertilizer material, which are left in the superphosphate under the usual method of manufacture which consists merely in the addition of acid to the material without removal of such non-phosphatic matters initially present. In the second place, the acid employed in treating the rock is generally sulphuric, with the result that a large quantity of calcium sulphate is formed simultaneously with the mono-calcium phosphate and remains mixed therewith as a substantially inert, useless diluent.

The proposal has heretofore been made to prepare fertilizers having higher percentages of $P_2O_5$ than are obtainable with sulphuric acid by treating the phosphate rock wih phosphoric acid. In this way the so-called "double superphosphate" or "treble superphosphate" may be prepared, having a $P_2O_5$ content of around 35 to 45%. This material, however, still contains the 25% or more of non-phosphatic material contained in the rock treated. Some of this 25% may not only be useless so far as fertilizer action is concerned but may also be positively deleterious. This is particularly true of iron and aluminum compounds which reduce the effectiveness of the phosphatic material by causing a part of the soluble phosphates to "revert" into insoluble form useless for fertilization purposes. Additional objectionable features and difficulties attending such prior processes appear from the following.

To supply the required conditions for acidulating the phosphate rock, it has been considered necessary to finely grind the rock and to have the acid sufficiently diluted to form a "soupy" mixture or slurry with the ground rock. But even by fine grinding of the rock and by the intimate contact therewith of an aqueous solution of the acid, the required reactions do not generally become complete during the mixing period nor even later at the lower acid strengths, particularly since there is a tendency to form coatings of a basic character such as di-calcic phosphate on the rock particles which more or less protect those particles from continued reaction with the acid to form the desired mono-calcium ortho-phosphate. The customary practice of delivering such treated material to "dumps" where it is left for a considerable period of time to "cure", is not only a generally unsatisfactory attempt to complete the required reactions between the rock and the acid, but also increases the cost of production in prolonging the time before the product can be sold.

While it was known that an excess of the acid would avoid the production of the dibasic phosphate and thereby keep the rock particles freely exposed to the acid so that little of the tricalcic phosphate would be left unattacked, the problem could not be thus solved in the prior processes referred to because the excess of acid, particularly in connection with impurities present, tended to the formation of a product having hygroscopic properties. Such product could not then be handled advantageously in sacks or otherwise, nor could it be applied to the soil desirably by the farmer in the lumpy form which it assumed.

Because of these conditions attending the prior processes referred to, of necessity an excess of the ground phosphate rock was employed over the acid to decompose it, with a resulting showing of an unavailable phosphorous compound in the product.

A principal object of my invention is to provide a simple, cheap process of making nearly pure acid phosphates, particularly mono-calcium ortho-phosphate, which process will be free from the difficulties and objectionable features attending the prior art processes referred to above.

A more particular object of my invention is to provide a process for the manufacture of the mono-calcium ortho-phosphate which avoids the expense of a previous or preparatory fine grinding of the rock employed as the starting material; which avoids the distinctly wet mix or slurry of the prior art and thus avoids the introduction with the acid of any considerable amount of water which must be disposed of later; which avoids the excess over acid of lime in one form or another heretofore held essential to insure a dry product and thereby avoids $P_2O_5$ in unavailable form in the final product, and, finally, which produces a product having a higher percentage of $P_2O_5$ in available form than that derived from any prior process of which I am aware. My invention also includes a preferred form of apparatus for carrying out the process.

Another particular object of my invention is to provide a process of the character referred to, and a preferred form of apparatus for carrying it into effect, by which the reaction products of the acid and rock material are removed from the surfaces of that material as fast as they are formed so as to avoid persistence of coatings thereon obstructing access of the acid to the rock material for continued reaction therewith.

Another particular object of my invention is the provision of a process, and a preferred form of apparatus for carrying it into effect, which will produce the desired alkaline earth acid or hydrogen phosphates, and more particularly mono-calcium ortho-phosphate, without any substantial proportion of dibasic or tribasic calcium phosphate or free phosphoric acid therein as left-overs from the reactions between the rock material and the phosphoric acid in producing the product. The attainment of this object is of considerable practical importance since dibasic calcium phosphate is not in as available form for fertilizer as the mono-calcium phosphate and also, as already stated, it does not have as high a percentage content of $P_2O_5$. Furthermore, tri-calcium phosphate is not available at all as fertilizer and therefore if present in the product reduces the percentage in the product of $P_2O_5$ in available form; while left-over phosphoric acid imparts undesired hygroscopic properties to the product. The broad operating feature of my invention whereby the last mentioned object is attained is to maintain the supply of phosphoric acid in excess or "ahead" of the rock material available to attack by the acid so as to completely decompose practically all tri-calcium phosphate initially in the rock material or formed during the reactions, thus avoiding the formation of di-calcium phosphate or decomposing substantially all that is formed; and then, in finishing the reaction, effect such a reduction in the acid relative to the rock material still available to attack thereby as to complete the formation of the desired mono-calcium phosphate with substantially no dibasic or tri-basic calcium phosphate or free phosphoric acid left over.

As already stated, phosphate rock, heretofore used as starting material for the production of alkaline earth acid or hydrogen phosphates, especially mono-calcium ortho-phosphate, for fertilizer use, contains some 20% or more of silicates, sand and other non-phosphatic material which appear in the final product as impurities substantially valueless as fertilizer. While my invention in its broad aspect is usefully applicable to the production of alkaline earth acid or hydrogen phosphates, especially mono-calcium ortho-phosphate, from phosphate rock, my invention in its more detailed concept is directed to avoiding the use of rock having such impurities and to the use instead of material consisting substantially wholly of carbonate which, when treated with phosphoric acid in the manner contemplated by the invention, produces a final product having a much higher percentage of $P_2O_5$ in available form for fertilizer purposes than is obtainable with phosphate rock.

Therefore in further presenting the principles of my invention, it will be described in its application to carbonate material, although, for reasons already given, it is to be understood that the invention is not limited thereto.

Large quantities of limestone (sometimes called "limerock") or calcium carbonate are available which contain 97% or more of $CaCO_3$. If this material is treated with pure phosphoric acid a mono-calcium phosphate is obtained having a purity corresponding with that of the limerock employed. The reaction is approximately as follows:

$$2\ H_3PO_4 + CaCO_3 = CO_2 + CaH_4(PO_4)_2 . H_2O$$

If the product is heated from 170° to 210° C., the mono-calcium ortho-phosphate loses its water of crystallization. If the temperature is raised from about 210° to 250° C., the mono-calcium ortho-phosphate is converted into di-calcium pyro-phosphate,

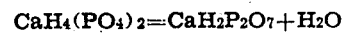

$$CaH_4(PO_4)_2 = CaH_2P_2O_7 + H_2O$$

This reaction begins at about 210° C. Further heating causes the loss of more water and the production of calcium meta-phosphate,

$$CaH_2P_2O_7 = Ca(PO_3)_2 + H_2O$$

The meta-phosphate thus formed is so slowly soluble in water that it is not useful in a fertilizer intended to obtain quick results.

The elimination of water in all the reaction set out above increases the proportion of $P_2O_5$. Thus, mono-calcium ortho-phosphate with one molecule of water of crystallization contains 55.3% $P_2O_5$. After that molecule of water has been removed the $P_2O_5$ content is 60.7%; and after the ortho-phosphate has been converted into pyro-phosphate, the content is 65.8%. For various reasons, including the greater avidity of the pyro-phosphate and meta-phosphate for water than that of the ortho-phosphate, it is ordinarily preferable to carry the water elimination only to the point of preparing the anhydrous mono-calcium ortho-phosphate, and my invention particularly contemplates this. However, the formation of acid pyro-phosphates or even meta-phosphates is within the scope of the present invention in its broader aspects.

The same general reaction is applicable to the formation of other alkaline earth acid phosphates, such as mono-magnesium ortho-phosphate $(MgH_4(PO_4)_2)$, from the corresponding carbonates, and this is within the intended field of my invention. Magnesium acid phosphates are, however, hygroscopic so that it is unsatisfactory to ship them in bags. For that reason, therefore, it is preferable to employ dolomitic limestone instead of using magnesite or some nearly pure compound of magnesium, the resultant acid phosphate composed of a mixture of calcium with magnesium being sufficiently non-hygroscopic to be shippable and drillable, meaning by the latter the possibility of distribution by a standard farm implement such as "seed drill". It is also desirable to use limestone and dolomite which is substantially free of iron and aluminum to avoid the "reversion" above mentioned.

To obtain a product having a high degree of purity it is, of course, desirable to use phosphoric acid having itself a high degree of purity with regard to the absence of any ingredients which might result in the final product containing non-phosphatic constituents in addition to those due to impurities in the limestone or other rock material employed.

Water is not such an impurity as will affect the final composition of the product. However, it is highly advantageous to use a concentrated acid since any water contained therein has to be evaporated at some stage in the process in order to obtain an anhydrous product. Anhydrous pure phosphoric acid is a solid up to a temperature of 42° C., hygroscopic and practically unmanageable, taking up water to form lesser strengths. It is more convenient and preferable, therefore, to use concentrated phosphoric acid of a certain definite lesser strength than anhydrous pure phosphoric acid; for example, an 85% acid, which is fluid at 24° C. Further, acid of 85% strength is more readily prepared than the substantially anhydrous acid.

The use of 85% acid gives an initial limestone-acid mixture with around 10% water content. This is about the percentage which is most suitable for practical commercial operation. A higher initial content up to 20% may also be used, and may reach 30% without serious disadvantage. In general, however, the amount of water present should most desirably not be sufficient to dissolve the major part of the final product that is readily soluble in water.

The conversion of the carbonate material into acid phosphate should, of course, be carried out as completely, expeditiously and cheaply as possible. To attain complete and rapid reaction it is necessary, however, to take into consideration the fact that the acid can act only on the exposed surfaces of the limestone particles. This involves not merely the inability of the acid to reach the center of the particles, except by progressive surface action, but also the inability of the acid to act even on the surface if the latter is covered by a layer of reaction products. It is eminently desirable, therefore, to remove such reaction products from the surface of such particles as fast as they are formed. Since in the present process there is not enough water present to dissolve such reaction products, the latter are desirably removed by continuous attrition of the carbonate particle surfaces. This may conveniently be accomplished by passing the mixture of crushed limestone and acid through a tube mill containing pebbles or other grinding elements not acted upon by phosphoric acid. Common steel balls, non-resistant to phosphoric acid are ordinarily to be avoided as tending to introduce iron into the product. With such an arrangement the limestone need not be crushed smaller than ¾". Especially with particles of that size, there is considerable mutual attrition between the limestone particles themselves in addition to that afforded by the pebbles or other grinding elements.

This attrition method of treatment is applicable not only to mixtures of coarsely comminuted carbonate and phosphoric acid but also to mixtures of coarsely comminuted phosphate rock and either phosphoric or sulphuric acid owing to the fact that, in the best mode of practicing the invention, the amount of water present is restricted as hereinbefore pointed out, such attrition or grinding does not produce soupy or slurry-like mixtures such as characterized the "wet mix" methods of the prior art. This is of great practical importance because it materially simplifies and cheapens the manufacture of high grade acid phosphate products.

To obtain close approach to complete reaction and to uniformity of product it has heretofore been customary in making ordinary superphosphate to grind the phosphate rock until 90% will pass 100 mesh. Even with such fine grinding it is necessary in such prior methods to deliver the product to dumps where it may be left for a considerable period to "cure", that is, to allow the reactions to proceed more or less to completion and avoid as far as possible free acid on the one hand and unattacked phosphate rock on the other hand.

As distinguished from such prior methods, in the present process the reaction is aided not only by removing reaction products from the surface of the carbonate particles through the mechanical attrition of those particles as stated above, but also by heating the reacting substances to a mild degree, with preferably an increased degree of heat as the final stage of the process is reached in the completion of the product. The heat so applied has the further advantageous result of drying the product and removing the water of crystallization or constitution from the mono-calcium phosphate formed. The temperature applied at the final stage in completing the final product should, preferably, be from about 100° C. to 200° C. Usually it is advisable to avoid forming pyro-phosphate and for that reason the product ordinarily should not be heated above about 210° C. Any temperature between these approximate limits may be employed.

Various forms of apparatus may be used for carrying out the process, including the furnace apparatus of my prior Patent 1,467,509, September 11, 1923. Another apparatus which I have devised and which I consider particularly suitable for carrying out the process of the present invention is shown somewhat diagrammatically by way of example in the accompanying drawing, of which Fig. 1 is a vertical longitudinal sectional view, and Fig. 2 is a transverse sectional view on the lines 2—2 of Fig. 1, on an enlarged scale.

The apparatus comprises a long rotatable tube 1, preferably substantially horizontal although it may be slightly inclined, if desired, preferably lined with suitable acid-resistant material, supported at its ends by rollers 2 and 3 and rotated by the gear 4. The tube is closed at its forward end by a plate 5 through the center of which extends a tube 6 leading from the bottom of a hopper 7 for the crushed limestone or the like. The latter is fed along the tube 6 by a worm conveyor 8. Also extending through the plate 5 is a pipe 9 for supplying concentrated liquid phosphoric acid. The rate of feed of limestone may be regulated by the speed of rotation of the conveyor 8. The flow of acid may be controlled by a valve 10. Alternatively or in addition to these methods of regulation the rate of supply of carbonate and acid may be controlled by weighing machines of well-known type and construction.

The tube 1 is provided with a grid 11 near its discharge end, and that end of the tube is contracted to form immediately to the rear of the grid a hopper-like portion 12 for the reception of the finished product. This hopper-like portion has discharge openings 12' in its rotating wall, each of which is normally held closed by a flap 14, pivotally mounted at 15 and provided with a counter-weight 16 to hold the flap 14 against the wall of the hopper-like portion of the tube until sufficient material has accumulated thereon to overcome its weight. In this way sufficient material is retained in the hopper-like portion of the rotating tube at all times to seal the openings therein against any substantial outward flow of heating and drying gases and against any material ingress of cold air.

A fire box 17 is provided for the combustion of fuel, the discharge flue of the fire box being so centered upon the reduced end portion of the tube 1 as to discharge into that tube while at the same time not obstructing rotative movement of the tube. Any convenient controllable heating means may be used. In the illustrated example, a thermostat-controlled gas burner is indicated at 18 to provide an adjustable control of the degree of heat applied. The hot products of combustion from the fire box 17 pass into the tube 1, through its hopper-portion 12, the grid 11, the remaining forward portion of the tube, and from thence into a flue 19 extending through the forward end plate 5 of the tube. These hot gases serve several functions; first, by the heat applied, to increase the rate of reaction between the acid and the limestone, second to carry off the carbon dioxide liberated and third to dry the product and carry off the water initially present in the reacting materials and also that formed by the reaction. It will be noted that the hot products of combustion pass through the tube 1 counter-current with respect to the acid and limestone so that the drying of the final product is aided by bringing the latter into contact with the hottest and dryest gases.

To permit rotation of the tube 1, it is to be noted that the flue 19 is fixedly supported, by stanchions 20, independently of the tube 1, and is centered about the axis of that tube, so that the tube with its end plate 5 rotates about the inner end portion of the flue 19. Also, the tube 6 for the feed of the rock material, and the pipe 9 for the feed of the acid, extend through the body of the flue 19, the tube 6 being additionally supported by the stanchion 21.

The tube 1 contains pebbles 22 which accumulate chiefly along the bottom run of the tube but which are in constant agitation due to the rotation of the tube.

When, as contemplated by my process, the coarsely ground or otherwise comminuted limestone or other rock employed is first introduced into the tube mill 1, its particles are large enough to produce, by their own rubbing together, mutual attrition substantially aiding in keeping their surfaces free of acid phosphate, but the constant agitation of the pebbles through the loose mass of the limestone particles completes this abrading action on the limestone particles along the length of the tube 1 to the grid 11 so as to insure the removal of the acid phosphate from the surfaces of the particles as fast as formed and thus constantly expose fresh surfaces of the rock itself to the action of the acid as the pebbles grind the rock and the formed calcic phosphate constantly to smaller particles.

The constant feeding in, through the tube 6, by the screw conveyor 8, of the relatively coarse particles of the limestone, together with the rotation of the tube 1 with the pebbles therein, gradually advance the limestone particles and formed calcic phosphate toward the grid 11, the limestone particles becoming gradually reduced in size and the formation of the calcic phosphate correspondingly gradually increasing, until by the time the grid 11 is reached substantially only calcic phosphate remains and discharges through the apertures of the grid into the hopper-like portion 12 of the tube mill where it accumulates on the lower run of the tube until sufficient in quantity and corresponding weight to open a flap 14 so that it is discharged into the receptacle 23.

The disc formation of the grid extending vertically and transversely of the axis of rotation of the tube and with the discharge slots 13 of the grid elongated in the radial direction, as shown in Fig. 2, facilitate the discharge of the product therethrough, as the product in contact with the feed-side face of the rotating grid tends first to ride up that face toward its center of rotation and then to slide downwardly toward the periphery of the grid and in consequence through the elongated slots of the grid.

It is also to be noted that while the heating gases from the fire box 17 travel entirely through the tube mill from the discharge end to the flue 19 at the feed-end of that mill, and therefore introduce a heating agent throughout the entire reaction zone of the materials, a very substantially higher degree of heat is applied to the reaction materials at the discharge end of the reaction zone beyond the grid than to the materials in the remaining forward part of the reaction zone. This application of heat throughout the entire reaction zone but of relatively mild degree in the initial major portion of that zone and of substantially higher degree at the discharge end of that zone, is of substantially practical advantage in stimulating the reaction from the beginning and in greatly accelerating the reaction as the discharge end is approached so as not only to facilitate completion of the reaction but also to insure substantial dryness in the discharged product. This application of heat to the materials at the discharge end of the reaction zone is also of practical advantage in insuring the reaction between any small portion of the limerock and the phosphoric acid which may not have been used up in the normal reaction period.

As already stated, one of the operating features of my process is the maintenance of the phosphoric acid in excess or "ahead" of the rock material available to attack by the acid until near the completion of the product so as to completely decompose any tri-calcium phosphate initially present in the rock material used or formed during the reactions and to avoid the permanent formation of dicalcium phosphate; and then effecting such a reduction in the acid relative to the rock material still available for attack thereby as to complete the reaction to the formation of the desired mono-calcium phosphate alone with substantially no left-over dibasic or tribasic calcium phosphate or acid in the product; thus avoiding not only that reduction in the product of the percentage content of $P_2O_5$ in the most available form which would result from having dibasic or tribasic calcium phosphate therein, but also that hygroscopic property of the product which left-over phosphoric acid would produce. Preferably, that operating feature of my process consists, not in providing an actual excess of the acid over the total required to carry through the reaction between acid and rock material to its completion in the formation of the desired monocalcium phosphate, but in providing as closely as possible the exact total of acid required and introducing rock of coarse size to the initial stage of the process and grinding the same to finer particles as the reaction proceeds, thus changing the proportion of rock material available to attack by the acid. In other words, since the acid can only act on the rock material at the surface of its particles, and since in the initial stage of the process the rock particles because of their relatively large size present small surfaces relative to their mass to attack by the acid, the acid is in excess or "ahead" of the material of the rock actually available to attack thereby. Also, as the rock particles become smaller and smaller by their grinding action upon one another and the action of other grinding means thereon, such as the pebbles in the apparatus described above, the extent of surface relative to the mass of rock material becomes constantly greater, which of course means that the proportion of rock material actually presented to attack by the acid increases until toward the end of the reaction stage the acid and rock material presented to attack thereby are in the proper proportion to complete the reaction to the formation of the desired monocalcium phosphate with substantially no left-over dibasic or tribasic calcium phosphate or free acid.

The grinding action of the rock particles upon one another and of the pebbles or other grinding mechanism on those particles therefore fulfills two purposes, the one last-mentioned above, and also the removal from the surfaces of the rock particles of reaction products as fast as they are formed so as to keep those surfaces free for continued attack by the acid. While the excess of acid over the rock material available to attack thereby will generally avoid the formation of dicalcic phosphate, any that may be formed will be rubbed off by the attrition or grinding of the rock particles and form the desired mono-calcium phosphate by uniting with the free phosphoric acid. During that process, of course, the degree of heat applied is regulated, for example by the adjustable thermostat-controlled burner 18 of the apparatus shown in the drawing, in conformity with the operating principles of the process as hereinbefore set forth.

What is claimed is:

1. The process of preparing alkaline earth acid phosphates from phosphoric acid and rock material which will react with said acid to produce said phosphates which comprises grinding said material from coarse to fine particles in the presence of said acid but in the absence of sufficient water to form with said rock material, when ground, a mixture that is soupy or slurry-like, while heating the reaction mixture and progressively reducing its moisture content as the reaction proceeds, until a relatively dry product is obtained of which the $P_2O_5$ content is mainly in the form of mono-basic phosphate, said acid being employed in the amount required to convert the alkaline earth base content of said material substantially all into mono-basic phosphate.

2. The process of preparing alkaline earth acid phosphates from phosphoric acid and rock material which will react with said acid to produce said phosphates which comprises mixing particles of said rock material with said acid of such concentration that the water content of the initial mixture does not substantially exceed 30 per cent and in the amount required to convert the alkaline earth base content of said material substantially all into mono-basic phosphate, and simultaneously heating said mixture and grinding said particles therein until the desired reaction is substantially complete and a substantially dry reaction product is obtained.

3. The process of preparing alkaline earth acid phosphates from phosphoric acid and rock material which will react with said acid under the influence of heat to produce said phosphates, said process comprising mixing said material initially in coarser comminuted form with concentrated phosphoric acid in the amount required to convert the alkaline earth base content of said material substantially all into mono-basic phosphate, and progressively grinding said material while applying thereto heat sufficient to carry the reaction substantially to completion and to produce a substantially dry reaction product.

4. The process of preparing alkaline earth acid phosphates which comprises treating relatively coarsely comminuted material consisting substantially wholly of carbonate with phosphoric acid in the presence of water insufficient to produce solution of the major part of the product, while mechanically reducing the particle size of said material and heating the reaction mixture sufficiently to ensure obtaining an acid phosphate product substantially free of water of crystallization.

5. The process as in claim 4 in which the total water present in the initial carbonate material and acid is not greater than 30% of the weight of such material and acid.

6. The process as in claim 4 in which the total water present in the initial carbonate material and acid is not greater than 20% of the weight of such material and acid.

7. The process as in claim 4 in which the total water present in the initial carbonate material and acid is about 10% of the weight of such material and acid.

8. The process of preparing acid calcium phosphates which comprises subjecting calcareous material, initially in relatively coarsely comminuted condition, to attrition in the presence of phosphoric acid employed in the amount required to convert the calcium content of said material substantially all into mono-calcium phosphate as a substantially dry product at the end of the reaction.

9. The process as in claim 8 in which the calcareous material is crushed to pass about ¾" mesh.

10. The process of making acid calcium phosphates which comprises subjecting lumps of substantially pure calcium carbonate to the simultaneous action of heat, attrition and concentrated phosphoric acid.

11. The process of preparing substantially pure anhydrous mono-calcium ortho-phosphate which comprises subjecting crushed limestone consisting substantially wholly of calcium carbonate to the simultaneous action of heat, attrition and concentrated substantially pure ortho-phosphoric acid, the intensity and duration of the heat treatment being regulated so as to vaporize water of crystallization without forming substantial amounts of pyrophosphate or metaphosphate.

12. The process of preparing an alkaline earth acid phosphate from phosphoric acid and rock material which will react with said acid to produce said phosphate which comprises bringing a mass of said rock material in divided form into contacting relation with a quantity of said acid sufficient to complete the entire reaction between said rock material and acid and to produce a substantially dry product at the end of the reaction consisting mainly of mono-calcium phosphate, and grinding said rock material to finer particles in the presence of said acid to diminish the proportion of said acid to said rock material available to attack thereby during the progress of the reaction between said acid and said rock material.

13. The process of preparing an alkaline earth acid phosphate from phosphoric acid and rock material reactive therewith to produce said acid phosphate, which comprises commingling said rock material in relatively coarsely comminuted condition with phosphoric acid in quantity required to produce a substantially dry product at the end of the reaction consisting mainly of monobasic phosphate, and mechanically reducing said rock material in the mixture to smaller size particles as the reaction progresses in order to expedite the reaction by progressively greatly increasing the surface area of rock material exposed to attack by the acid in proportion to the volume of the individual particles, while nevertheless maintaining the proportion of acid in substantial excess with respect to such exposed area until near the end of the reaction, thereby enabling the reaction to proceed rapidly and yet ensuring substantial freedom of the resultant desired acid phosphate from less soluble phosphates.

14. The process of preparing mono-calcium phosphate substantially free of dibasic and tribasic calcium phosphate from rock material reactive with phosphoric acid to produce mono-calcium phosphate, which comprises commingling said rock material in relatively coarsely comminuted condition with phosphoric acid in quantity approximately just sufficient to complete the desired action, in the absence of sufficient water to dissolve the major portion of resultant soluble reaction products, and grinding the mixture to effect progressive reduction in particle size of said rock material as the reaction proceeds and until it is substantially completed, thereby obtaining as a resultant product mono-calcium phosphate substantially free of dibasic and tribasic calcium phosphate and also low in water content.

15. The process defined in claim 14 wherein the water content of the initial mixture does not substantially exceed 30 per cent and the mixture is heated during the process to temperatures not materially above 210° C. but sufficiently high to render the resultant mono-calcium phosphate substantially anhydrous.

16. The process of preparing mono-calcium phosphate having very high available $P_2O_5$ content but containing substantially no free phosphoric acid, which comprises commingling relatively coarsely comminuted limestone of high purity with concentrated phosphuric acid, agitating the mixture to effect attrition of the rock particles and reduce their size while heating the reaction mass to temperatures sufficiently high to drive off water of crystallization but not substantially above 210° C., and obtaining resultant mono-calcium phosphate in substantially anhydrous condition.

17. The process of preparing an alkaline earth acid phosphate from phosphoric acid and rock material reactive therewith to produce said acid phosphate, which comprises continuously feeding a mixture of said rock material and phosphoric acid into a heating zone and moving it therethrough to a point of discharge, and heating said mixture to progressively higher temperatures as it travels toward such point of discharge, while continuously agitating the mixture to effect mechanical attrition of its component solid particles and progressive reduction in size thereof, the amount of water present being so restricted, however, that such reduction does not produce a soupy or slurry-like mixture, the treatment being continued until a substantially dry product is obtained whose $P_2O_5$ content is mostly in the form of acid phosphate.

18. The process of preparing an alkaline earth acid phosphate from phosphoric acid and rock material reactive therewith to produce said acid phosphate, which comprises continuously feeding a mixture of said rock material and concentrated phosphoric acid into a heating zone and moving it therethrough to a point of discharge, said acid being of such concentration that the moisture content of the mixture initially fed in does not substantially exceed 30 per cent, and passing hot combustion gases through said heating zone counter-current to the travel of the mixture therethrough and in heat transmitting relation thereto, while so controlling the aforesaid operating conditions that the desired reaction is substantially completed when the mixture has traveled through the heating zone and the product is discharged therefrom in substantially dry condition, the mixture initially fed in comprising relatively coarsely communited rock material which is subjected substantially continuously to mechanical attrition or grinding as it travels through said heating zone toward said point of discharge.

19. The process of preparing an alkaline earth acid phosphate from phosphoric acid and rock material reactive therewith to produce said acid phosphate, which comprises continuously feeding a mixture of said rock material and concentrated phosphoric acid into a heating zone and moving it therethrough to a point of discharge, said acid being of such concentration that the moisture content of the mixture initially fed in does not substantially exceed 30 per cent, and passing hot combustion gases through said heating zone counter-current to the travel of the mixture therethrough and in heat transmitting relation thereto, while so controlling the aforesaid operating conditions that the desired reaction is substantially completed when the mixture has traveled through the heating zone and the product is discharged therefrom in substantially dry condition, the mixture initially fed in comprising relatively coarsely comminuted rock material which is subjected substantially continuously to mechanical attrition or grinding as it travels through said heating zone toward said point of discharge, the reaction mass being heated to temperatures sufficiently high to render the resultant acid phosphate substantially anhydrous but insufficiently high to produce a substantial proportion of less soluble phosphates.

20. The process of preparing an alkaline earth acid phosphate from phosphoric acid and rock material reactive therewith to produce said acid phosphate, which comprises continuously feeding a mixture of said rock material and concentrated phosphoric acid into a heating zone and moving it therethrough to a point of discharge, said acid being of such concentration that the moisture content of the mixture initially fed in does not substantially exceed 30 per cent, and passing hot combustion gases through said heating zone counter-current to the travel of the mixture therethrough and in heat transmitting relation thereto, while so controlling the aforesaid operating conditions that the desired reaction is substantially completed when the mixture has traveled through the heating zone and the product is discharged therefrom in substantially dry condition, the mixture initially fed in comprising relatively coarsely comminuted rock material which is subjected substantially continuously to mechanical attrition or grinding as it travels through said heating zone toward said point of discharge, the reaction mass being heated to temperatures in excess of 100° C. but not substantially above 210° C.

21. The process of preparing acid phosphate from phosphate rock or the like, which comprises commingling phosphate rock or the like in relatively coarsely comminuted condition with a mineral acid capable of reacting thereon and employed in amount and concentration required to produce a substantially dry product at the end of the reaction consisting largely of mono-calcium phosphate, and grinding the mixture to effect progressive reduction in particle size of the solid material as the reaction proceeds and until it is substantially complete, the amount of water present being so restricted that the grinding does not produce a soupy or slurry-like mixture and the commingled materials being subjected to progressively higher temperatures and drying conditions, whereby a finely divided acid phosphate product of high mono-calcium phosphate content but low moisture content is obtained.

22. The process defined in claim 21 wherein the mineral acid employed is phospheric acid.

23. The process defined in claim 21, wherein the mineral acid employed is sulphuric acid.

24. The process of preparing products rich in water soluble alkaline earth acid phosphates by reaction between phosphoric acid and raw rock material reactive therewith to produce the desired acid phosphate, which comprises substantially continuously commingling relatively coarsely comminuted raw rock material of the character aforesaid with relatively concentrated phosphoric acid in proportion adusted and controlled to approximate closely that required to complete the desired reaction, in the absence of sufficient water to dissolve the major part of the desired acid phosphate finally produced, advancing the mixture substantially continuously through a reaction zone while progressively reducing said rock material to smaller particle size and while subjecting the advancing mixture to progressively higher temperatures through contact with a current of hot gases until the desired reaction is completed, and discharging the resultant material from said zone as a finely divided and substantially dry finished acid phosphate product ready for immediate use.

25. The process as defined in claim 24 wherein the rock material employed is phosphate rock.

26. The process as defined in claim 24 wherein the rock material employed is a limestone.

27. The process as defined in claim 24 wherein the rock material employed is a dolomitic limestone.

LEWIS BAILEY SKINNER.